United States Patent [19]
Stein et al.

[11] 3,893,966
[45] July 8, 1975

[54] IMPACT-RESISTANT THERMOPLASTIC MOLDING MATERIAL

[75] Inventors: Dieter Stein, Limburgerhof; Franz Haaf, Ludwigshafen; Karl-Heinz Illers, Otterstadt, all of Germany

[73] Assignee: Badische Anilin- & Soda-Fabrik Aktiengesellschaft, Ludwigshafen (Rhine), Germany

[22] Filed: June 27, 1973

[21] Appl. No.: 373,979

Related U.S. Application Data

[63] Continuation of Ser. No. 126,944, March 22, 1971, abandoned.

[52] U.S. Cl... 260/30.8 R; 260/31.2 N; 260/31.4 R; 260/31.8 M; 260/31.8 DR; 260/31.8 AN; 260/31.8 C
[51] Int. Cl. ............................................ C08f 45/36
[58] Field of Search..... 260/31.2 N, 31.2 R, 31.2 X, 260/880 R, 31.8 D, 30.8 R, 31.4 R, 31.8 M, 31.8 DR, 31.8 AN, 31.8 C

[56] References Cited
UNITED STATES PATENTS
2,723,970  11/1955  Foct.................................. 260/80.7
3,280,219  10/1966  Siebel ............................... 260/876

OTHER PUBLICATIONS
Rubber World, Pollack, Dec. 1956, pp. 437–438, USPO, GRP 140.
Technology of Solvents & Plasticizers, Doolittle, 1962, pp. 897–927 and 969–977, USPO GRP 140.

*Primary Examiner*—James H. Derrington
*Attorney, Agent, or Firm*—Johnston, Keil, Thompson & Shurtleff

[57] ABSTRACT

Impact-resistant thermoplastic molding materials comprising:
A. from 5 to 100 parts by weight of a graft copolymer prepared by grafting from 10 to 95% by weight of a mixture of styrene and acrylonitrile in a ratio of 60 : 40 to 90 : 10 onto from 90 to 5% by weight of a polyacrylate rubber which contains at least 30% by weight of polymerized units of an alkyl acrylate having not more than 8 carbon atoms in the alkyl radical;
B. from 0 to 95 parts by weight of a copolymer of styrene and acrylonitrile in a ratio of 60:40 to 90:10 and
C. from 1 to 10 parts by weight, with reference to 100 parts by weight of (A) + (B), of an ester having the general formula:

$$R^1 - X - R^2$$

where $R^1$ and $R^2$ each denotes an alkyl or aryl radical having 4 to 20 carbon atoms and X is either a —OOC— group or a —OOC—$R^3$—COO— group where $R^3$ denotes an alkyl or aryl grouping having 1 to 20 carbon atoms; the groupings $R^1$, $R^2$ and $R^3$ may optionally also contain heteroatoms, and the sum of the carbon atoms in the ester molecule is at least 15.

3 Claims, No Drawings

IMPACT-RESISTANT THERMOPLASTIC MOLDING MATERIAL

This is a continuation, of application Ser. No. 126,944, filed Mar. 22, 1971 now abandoned.

The invention relates to impact-resistant thermoplastic molding materials having improved low-temperature toughness.

Graft copolymers prepared by grafting styrene and acrylonitrile onto polybutadiene rubbers are known and are referred to as ABS plastics. It is also known that the resistance to aging and thermal stability of ABS plastics can be improved by replacing all or part of the butadiene in the rubber used by an acrylic ester. These plastics are described for example in German Pat. Nos. 1,082,051; 1,138,921; 1,164,080; 1,182,811; 1,182,830; and 1,238,207 and in German Printed Applications Nos. 1,116,403 and 1,224,486. As compared with ABS plastics based on polybutadiene, they have the disadvantage that they are less tough at low temperatures.

It is known that the addition of plasticizers improves the low-temperature properties of polyvinyl chloride. It has been found however that in impact-resistant mixtures the plasticizer generally penetrates preferentially the rigid component and thus greatly decreases their heat distortion strength without improving their low-temperature impact strength.

It is therefore an object of the invention to improve the low-temperature toughness of impact-resistant thermoplastic compositions without appreciably impairing their heat distortion strength.

We have found that this object is achieved when to an impact-resistant thermoplastic molding material comprising A. from 5 to 100 parts by weight of a graft copolymer prepared by grafting from 10 to 95% by weight of a mixture of styrene and acrylonitrile in a ratio of from 60 : 40 to 90 : 10 onto from 90 to 5% by weight of a polyacrylate rubber which contains at least 30% by weight of polymerized units of an alkyl acrylate having not more than eight carbon atoms in the alkyl radical, and B. from 0 to 95 parts by weight of a copolymer of styrene and acrylonitrile in a ratio of from 60 : 40 to 90 : 10 there is added C. from 1 to 10 parts by weight, with reference to 100 parts by weight of (A) + (B), of a specific plasticizer.

Suitable plasticizers are esters having the general formula:

$$R^1-X-R^2$$

where $R^1$ and $R^2$ each denotes an alkyl or aryl radical having 4 to 20 carbon atoms and X is either a —OOC— group or a —OOC—$R^3$—COO— group where $R^3$ denotes an alkyl or aryl group having 1 to 20 carbon atoms. The groupings $R^1$, $R^2$ and $R^3$ may optionally also contain heteroatoms, and the sum of the carbon atoms in the ester molecule is at least 15.

The impact-resistant thermoplastic molding materials are prepared by conventional methods, for example by the methods described in the abovementioned patents, the graft copolymerization of styrene and acrylonitrile onto the polyacrylate rubber being preferably carried out in aqueous emulsion. The whole of the sytrene and acrylonitrile may be polymerized in the presence of the rubber, but it is more advantageous to graft only a portion (soft component (A)) direct and then to blend it with the separately prepared sytrene/acrylonitrile copolymer (rigid component (B)). In any case the mixutre (A) + (B) should however contain at least 50% by weight of styrene and acrylonitrile.

The rubber used is an acrylic ester polymer containing at least 30% by weight of polymerized units of an alkyl acrylate having not more than eight carbon atoms in the alkyl radical. Butyl acrylate and ethylhexyl acrylate are preferred. Rubbers which consist of:

30 to 77% by weight of acrylic ester,
20 to 40% by weight of butadiene and
3 to 30% by weight of a vinyl alkyl ether have proved to be particularly favorable.

Other preferred rubbers are copolymers of from 90 to 99% by weight of acrylic ester and from 1 to 10% by weight of comonomers containing at least two double bonds. Esters of monocarboxylic or dicarboxylic acids are suitable as plasticizers. The monocarboxylic esters preferably contain alkyl groups having from 4 to 20 carbon atoms both as the alcohol radical $R^1$ and as the acid radical $R^2$. $R^1$ and $R^2$ may be identical or different. The dicarboxylic esters contain as the acid radical $R^3$ an alkyl or aryl grouping having from 1 to 20 carbon atoms. The groupings $R^1$, $R^2$ and $R^3$ may be optionally interrupted by heteroatoms, preferably oxygen or sulfur. The two alcohol radicals $R^1$ and $R^2$ are in the case of dicarboxylic esters preferably alkyl groups having 4 to 20 carbon atoms. The plasticizer should have a boiling point of at least 250°C at atmospheric pressure because otherwise losses due to evaporation may occur during processing. In all cases the sum of the carbon atoms in the molecule of the plasticizer molecule must be at least 15.

Isodecyl 2-ethylhexanoate, di-(2-ethylhexyl) adipate, dinonyl adipate and di-(2-ethylhexyl) thiobutyrate give the best results.

A preferred embodiment of the invention consists in mixing the soft component (A), the rigid component (B) and the plasticizer (C) on conventional mixing equipment such as extruders, kneaders or rolls at temperatures of from 180° to 260°C. It is however also possible to incorporate the plasticizer (C) into the dispersion of the rubber after, or even before, the graft polymerization.

Additives such as fillers, pigments, stabilizers and lubricants may, if desired, be added during processing.

The advantages according to the invention are obtained when the whole mixture contains 1 to 10, preferably 2 to 8 parts, by weight, with reference to 100 parts by weight of components (A) and (B), of plasticizer (C). A mixture of two or more plasticizers may be used, in which case the sum of the parts by weight thereof, with reference to 100 parts of the whole mixture, should again be from 1 to 10. When the plasticizer according to the invention is used, there is a considerable improvement in the products' low-temperature impact strength without their heat distortion strength being unduly impaired. However, when other conventional plasticizers (which are not according to the invention) are mixed in there is either only a slight improvement in the products' low-temperature toughness or none at all and at the same time a considerable deterioration in their heat distortion strength.

The invention is illustrated by the following Examples in which parts and percentages are by weight.

The mean rupture energy is taken as a measure of the low-temperature impact strength: the mean energy is measured which is required to break a small disc having a thickness of 1 mm (prepared by injection molding at a temperature of the material of 240°C) at −40°C. This impact test is carried out with an apparatus consisting essentially of the following parts: a base plate having guide columns for the darts, speciment holders (rings 30 mm in diameter), a number of darts of varying weight and additional weights for the same. The tips of the darts are hemispherical in shape and 18 mm in diameter. The number of breakages is determined which occur in a plurality of batches of 10 discs each at different levels of energy, i.e. with a different dart weight at a constant height of fall. There is thus obtained a correlation between the frequency of rupture in % and specific energy values in cm × kg. If the frequency of rupture is plotted against the energy in a probability graph, a good approximation to a straight line is obtained. The point of intersection of this straight line with the 50% line gives the value for the mean rupture energy.

A measure of the heat distortion strength is the VICAT softening point measured in silicone oil according to DIN 53,460.

EXAMPLE 1

Thermoplastic molding materials are prepared by mixing in an extruder at about 220°C:
A. 30 parts of a graft copolymer prepared by grafting 30% of styrene and acrylonitrile in the ratio 70 : 30 onto 70% of a copolymer of 58% of butyl acrylate, 38% of butadiene and 4% of vinyl methyl ether;
B. 70 parts of a copolymer of styrene and acrylonitrile in the ratio 65 : 35; and
C. 6 parts of plasticizer.
The results are given in Table 1 in which
RE = rupture energy at −40°C and
VN = VICAT number.
Ex = Experiment.

TABLE 1

| Ex | Plasticizer used | RE | VN |
|---|---|---|---|
| a | — | 1 | 98 |
| b | $C_7H_{15}$—COO—$C_{10}H_{21}$ | 45 | 93 |
| c | $C_8H_{17}$—OOC—$C_4H_8$—COO—$C_8H_{17}$ | 68 | 91 |
| d | $C_9H_{19}$—OOC—$C_4H_8$—COO—$C_9H_{19}$ | 54 | 92 |
| e | $C_8H_{17}$—OOC—$C_3H_6$—S—$C_3H_6$—COO—$C_8H_{17}$ | 65 | 91 |
| f | $C_{17}H_{35}$—COO—$C_4H_9$ | 37 | 97 |
| g | $C_{10}H_{21}$—OOC—$C_6H_4$—COO—$C_{10}H_{21}$ | 37 | 95 |
| h | $C_8H_{17}$—OOC—$C_6H_4$—COO—$C_8H_{17}$ | 25 | 92 |
| i | $C_4H_9$—OOC—$C_8H_{16}$—COO—$C_4H_9$ | 72 | 88 |
| k | $C_4H_9$—OOC—$C_{15}H_{30}$—COO—$C_4H_9$ | 18 | 91 |
| L | $C_{18}H_{37}$—OH | 1 | 98 |
| m | $C_{17}H_{35}$—COOH | 9 | 91 |
| n | $C_{17}H_{35}$—COO—$CH_2$—CH(OH)—$CH_2$OH | 7 | 92 |
| o | H(OOC—$C_4H_8$—COO—$C_4H_8$)$_6$—OH | 1 | 95 |
| p | H(OCH$_2$—CH$_2$)$_x$—OH | 1 | 95 |
| q | (CH$_3$—C$_6$H$_4$—O)$_3$PO | 1 | 90 |

No plasticizer is added in Experiment a. Preferred esters are used in Experiments b to e; other esters according to the invention are used in Experiments f to k.

Experiments l to q serve as Comparative Examples in which plasticizers which are not in accordance with the invention are used, namely:
l = octadecyl alcohol
m = stearic acid
n = glycerol monostearate
o = a polyester derived from adipic acid and butanediol
p = a polyether derived from ethylene oxide
q = tricresyl phosphate.

EXAMPLE 2

Thermoplastic molding materials are prepared by mixing:
A. 40 parts of a graft copolymer prepared by grafting 40% of styrene and acrylonitrile in the ratio 70 : 30 onto 60% of a butyl acrylate copolymer which contains 98% of butyl acrylate and 2% of a comonomer containing two double bonds;
B. 60 parts of a copolymer of styrene and acrylonitrile in the ratio 68 : 32; and
C. 6 parts of plasticizer.
The results are given in the following Table 2:

| Ex | Plasticizer used | RE | VN |
|---|---|---|---|
| a | — | <0.5 | 97 |
| b | $C_7H_{15}$—COO—$C_{10}H_{21}$ | 3 | 90 |
| c | $C_9H_{19}$—OOC—$C_4H_8$—COO—$C_9H_{19}$ 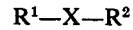 | 8 | 93 |

We claim:
1. An impact-resistant thermoplastic molding material comprising:
A. from 5 to 100 parts by weight of a graft copolymer prepared by grafting from 10 to 95% by weight of a mixture of styrene and acrylonitrile in a ratio of 60 : 40 to 90 : 10 onto from 90 to 5% by weight of a polyacrylate rubber which contains at least 30% by weight of polymerized units of an alkyl acrylate having not more than eight carbon atoms in the alkyl radical;
B. from 0 to 95 parts by weight of a copolymer of styrene and acrylonitrile in a ratio of 60 : 40 to 90 : 10 with the proviso that (A) plus (B) contains at least 50% by weight of styrene and acrylonitrile; and
C. from 1 to 10 parts by weight, with reference to 100 parts by weight of (A) + (B), of an ester having the formula:

$$R^1—X—R^2$$

where $R^1$ and $R^2$ each denotes an alkyl or aryl radical having four to twenty carbon atoms and X is either a —OOC— group or a —OOC—$R^3$—COO— group where $R^3$ denotes an alkylene or arylene grouping having 1 to 20 carbon atoms, the groupings $R^1$, $R^2$ and $R^3$ optionally also containing heteroatoms selected from the group consisting oxygen and sulfur and the sum of the carbon atoms in the ester molecule being at least 15.

2. A material as claimed in claim 1 wherein the ester (C) is isodecyl 2-ethylhexanoate, di-(2-ethylhexyl) adipate, dinonyl adipate or di-(2-ethylhexyl) thiobutyrate.

3. A material as set forth in claim 1 wherein said polyacrylate rubber comprises 90 to 99% by weight of an acrylate ester and from 1 to 10% by weight of a comonomer containing at least two double bonds.

* * * * *

UNITED STATES PATENT AND TRADEMARK OFFICE
CERTIFICATE OF CORRECTION

PATENT NO. : 3,893,966
DATED : July 8, 1975
INVENTOR(S) : Stein et al

It is certified that error appears in the above-identified patent and that said Letters Patent are hereby corrected as shown below:

IN THE HEADING

Insert

--- [30] Foreign Application Priority Data

May 5, 1970.....Fed. Rep. of Germany ....20 21 898 --.

In Column 3, line 8, delete "speciment" and substitute

--- specimen --- .

Signed and Sealed this

Twenty-ninth Day of July 1980

[SEAL]

Attest:

SIDNEY A. DIAMOND

Attesting Officer    Commissioner of Patents and Trademarks